(12) United States Patent
Qin

(10) Patent No.: US 10,915,828 B2
(45) Date of Patent: Feb. 9, 2021

(54) WEBSITE ADDRESS IDENTIFICATION METHOD AND APPARATUS

(71) Applicant: BEIJING BAIDU NETCOM SCIENCE AND TECHNOLOGY, LTD., Beijing (CN)

(72) Inventor: Duohao Qin, Beijing (CN)

(*) Notice: Subject to any disclaimer, the term of this patent is extended or adjusted under 35 U.S.C. 154(b) by 755 days.

(21) Appl. No.: 15/246,261

(22) Filed: Aug. 24, 2016

(65) Prior Publication Data

US 2017/0193386 A1 Jul. 6, 2017

(30) Foreign Application Priority Data

Jan. 4, 2016 (CN) .......................... 2016 1 0003891

(51) Int. Cl.
*G06N 7/00* (2006.01)
*H04L 29/08* (2006.01)
*G06N 20/00* (2019.01)
*G06N 5/02* (2006.01)

(52) U.S. Cl.
CPC ............... *G06N 7/005* (2013.01); *G06N 5/02* (2013.01); *G06N 20/00* (2019.01); *H04L 67/10* (2013.01); *H04L 67/2823* (2013.01); *H04L 67/02* (2013.01)

(58) Field of Classification Search
CPC . H04L 67/2823; H04L 63/14; H04L 63/1483; H04L 63/671; G06N 5/02; G06N 7/005; G06N 20/00
See application file for complete search history.

(56) References Cited

U.S. PATENT DOCUMENTS

| 9,477,836 | B1* | 10/2016 | Ramam | G06F 21/6263 |
| 2009/0240670 | A1 | 9/2009 | Tiyyagura et al. | |
| 2010/0186088 | A1* | 7/2010 | Banerjee | G06F 21/51 726/23 |
| 2017/0126719 | A1* | 5/2017 | Mason | G06F 17/2247 |

OTHER PUBLICATIONS

Kurt Thomas, Design and Evaluation of a Real-Time URL Spam Filtering Service, May 2011, IEEE.*
Honglak Lee, Spam Deobfuscation using a Hidden Markov Model, Jul. 2005, CEAS.*

(Continued)

*Primary Examiner* — Benjamin P Geib

(74) *Attorney, Agent, or Firm* — Marshall, Gerstein & Borun LLP

(57) ABSTRACT

The present application discloses a website address identification method and apparatus. A specific embodiment of the method includes: obtaining a website address to be identified; segmenting the to-be-identified website address into a plurality of website address parts according to a preset rule, and converting each of the segmented website address parts into a type identifier corresponding to a content type of the each of the segmented website address parts; determining a probability value of the to-be-identified website address as a non-spam website address according to a type identifier sequence corresponding to the to-be-identified website address; and generating website address identification information according to the probability value. According to the embodiment, the website address identification range is expanded.

20 Claims, 6 Drawing Sheets

(56) References Cited

OTHER PUBLICATIONS

Franco Salvetti, "Weblog Classification for Fast Splog Filtering: A URL Language Model Segmentation Approach," Dept. of Computer Science, Univ. of Colorado at Boulder (Year: 2007).*

Darling, M., Heileman, G., Gressel, G., Ashok, A., & Poornachandran, P. (Jul. 2015). A lexical approach for classifying malicious URLs. In 2015 international conference on high performance computing & simulation (HPCS) (pp. 195-202). IEEE. (Year: 2015).*

Blum, A., Wardman, B., Solorio, T., & Warner, G. (Oct. 2010). Lexical feature based phishing URL detection using online learning. In Proceedings of the 3rd ACM Workshop on Artificial Intelligence and Security (pp. 54-60). (Year: 2010).*

\* cited by examiner

WEBSITE ADDRESS IDENTIFICATION METHOD AND APPARATUS

CROSS REFERENCE TO RELATED APPLICATION

This application claims the priority of Chinese Patent Application No. 201610003891.5, entitled "Website Address Identification Method and Apparatus" filed on Jan. 4, 2016, the content of which is incorporated herein by reference in its entirety.

TECHNICAL FIELD

The present disclosure relates generally to the field of computers, specifically to the field of the Internet, and more specifically to a website address identification method and apparatus.

BACKGROUND

There are many spam website on the Internet. The fake spam website often induce people to click to gain click flow, and may even fraudulently obtain user names and passwords and other private information. Therefore, these spam website addresses need to be actively identified to properly notify users.

In the prior art, the identification of the spam website addresses is mainly realized by setting a webpage white list, setting a webpage blacklist or identifying webpage contents crawled from the website. However, it is not possible to list all ordinary website address in the white list, newly generated spam website address cannot be identified using the blacklist approach, and with regard to the identification based on the crawled webpage contents, the spam website address may not be accurately identified if the website sets crawling prohibition or clones an ordinary site to obtain the user passwords. Therefore, the identification range for the spam website addresses needs to be expanded.

SUMMARY

The object of the present application is to provide an improved website address identification method and apparatus, in order to solve the technical problems mentioned in the background.

In a first aspect, the present application provides a website address identification method, including: obtaining a website address to be identified; segmenting the to-be-identified website address into a plurality of website address parts according to a preset rule, and converting each of the segmented website address parts into a type identifier corresponding to a content type of the each of the segmented website address parts; determining a probability value of the to-be-identified website address as a non-spam website address according to a type identifier sequence corresponding to the to-be-identified website address; and generating website address identification information according to the probability value.

In some embodiments, determining a probability value of the to-be-identified website address as a non-spam website address according to a type identifier sequence corresponding to the to-be-identified website address comprises: using the type identifier sequence as an observation sequence of a hidden Markov model, and calculating a probability value corresponding to the observation sequence according to a forward algorithm and a pre-trained hidden Markov model parameter; and using the calculated probability value as the probability value of the to-be-identified website address as the non-spam website address.

In some embodiments, before obtaining a website address to be identified, the method further includes: obtaining a non-spam website address set from a log server; segmenting each website address in the non-spam website address set according to the preset rule, and converting the segmented website address parts of each website address into type identifiers corresponding to the content types of the website address parts to generate a type identifier sequence set containing the type identifier sequence of each website address; using the type identifier sequence set as an observation sequence set to be trained of the hidden Markov model, and determining the hidden Markov model parameter according to a maximum expectation algorithm; and using the determined hidden Markov model parameter as the pre-trained hidden Markov model parameter, or updating the pre-trained hidden Markov model parameter according to the determined hidden Markov model parameter before obtaining a website address to be identified, the method further comprises obtaining a non-spam website address set from a log server; segmenting each website address in the non-spam website address set into a plurality of website address parts according to the preset rule, and converting each of the segmented website address parts of each website address into the type identifier corresponding to the content type of the each of the segmented website address parts to generate a type identifier sequence set containing the type identifier sequence of each website address; using the type identifier sequence set as an observation sequence set to be trained of the hidden Markov model, and determining the hidden Markov model parameter according to a maximum expectation algorithm; and using the determined hidden Markov model parameter as the pre-trained hidden Markov model parameter, or updating the pre-trained hidden Markov model parameter according to the determined hidden Markov model parameter.

In some embodiments, the maximum expectation algorithm is a forward-backward algorithm.

In some embodiments, generating website address identification information according to the probability value comprises: generating non-spam website address notification information in response to the probability value being larger than a preset probability threshold.

In some embodiments, generating website address identification information according to the probability value comprises: generating spam website address notification information in response to the probability value being smaller than the preset probability threshold.

In some embodiments, after generating spam website address notification information in response to the probability value being smaller than the preset probability threshold, the method further comprises: receiving confirmation information of the user about whether the to-be-identified website address is a spam website address or a non-spam website address; and using the type identifier sequence corresponding to the to-be-identified website address that is confirmed as the non-spam website address as the observation sequence to be trained of the hidden Markov model, and updating the pre-trained hidden Markov model parameter with the maximum expectation algorithm.

In a second aspect, the present application provides a website address identification apparatus, including: an obtaining unit for obtaining a website address to be identified; a segmenting and converting unit for segmenting the to-be-identified website address into a plurality of website address parts according to a preset rule, and converting each of the segmented website address parts into a type identifier corresponding to a content type of the each of the segmented website address parts; a probability determining unit for determining a probability value of the to-be-identified website address as a non-spam website address according to a type identifier sequence corresponding to the to-be-identified website address; and a generation unit for generating website address identification information according to the probability value.

In some embodiments, the probability determining unit comprises: a calculation subunit for using the type identifier sequence as an observation sequence of a hidden Markov model, and calculating a probability value corresponding to the observation sequence according to a forward algorithm and a pre-trained hidden Markov model parameter; and a probability determining subunit for using the calculated probability value as the probability value of the to-be-identified website address as the non-spam website address.

In some embodiments, the apparatus further includes: a non-spam website address set obtaining unit for obtaining a non-spam website address set from a log server; a non-spam website address set segmenting and converting unit for segmenting each website address in the non-spam website address set into a plurality of website address parts according to the preset rule, and converting each of the segmented website address parts of each website address into the type identifier corresponding to the content type of the each of the segmented website address parts to generate a type identifier sequence set containing the type identifier sequence of each website address; a model parameter calculation unit for using the type identifier sequence set as an observation sequence set to be trained of the hidden Markov model, and determining the hidden Markov model parameter according to a maximum expectation algorithm; and a model parameter determining and updating unit for using the determined hidden Markov model parameter as the pre-trained hidden Markov model parameter, or updating the pre-trained hidden Markov model parameter according to the determined hidden Markov model parameter.

In some embodiments, the maximum expectation algorithm is a forward-backward algorithm.

In some embodiments, the generation unit is further used for generating non-spam website address notification information in response to the probability value being larger than a preset probability threshold.

In some embodiments, the generation unit is further used for generating spam website address notification information in response to the probability value being smaller than the preset probability threshold.

In some embodiments, the apparatus further includes: a confirmation information receiving unit for receiving confirmation information of the user about whether the to-be-identified website address is a spam website address or a non-spam website address; and a parameter adjusting unit for using the type identifier sequence corresponding to the to-be-identified website address that is confirmed as the non-spam website address as the observation sequence to be trained of the hidden Markov model, and updating the pre-trained hidden Markov model parameter with the maximum expectation algorithm.

According to the website address identification method and apparatus provided by the present application, the to-be-identified website address is converted into the corresponding type identifier sequence, the probability of the to-be-identified website address being the non-spam website address is calculated according to the type identifier sequence to generate the website address identification information. Since the to-be-identified website address is converted into the type identifier sequence before the identification is performed, the to-be-identified website address can be identified only according to the type identifier sequence, and a historical website address corresponding to the to-be-identified website address does not need to be stored in advance, so that the website address identification range is expanded.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
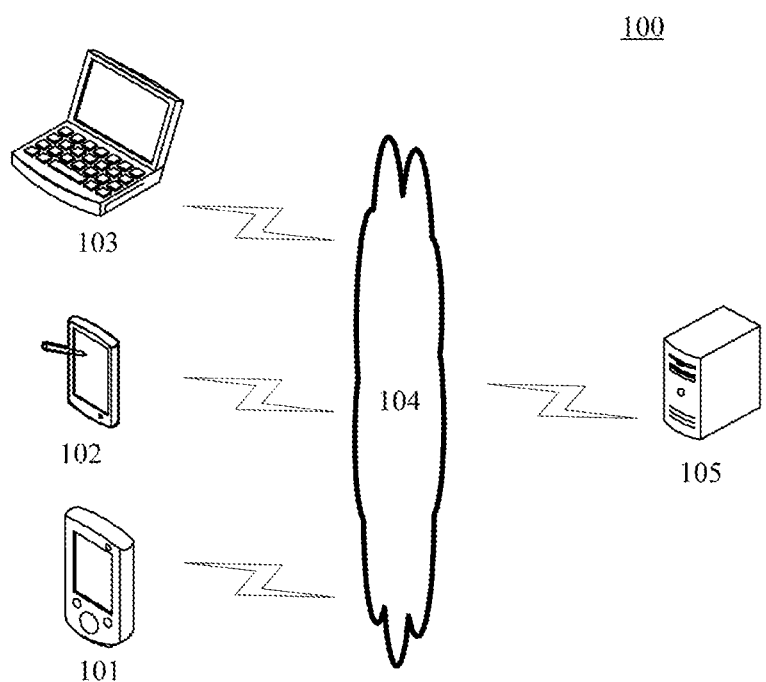
FIG. 1 is an architectural diagram of an exemplary system in which the present application may be implemented.

FIG. 1 shows an exemplary architecture of a system 100 which may be used by a website address identification method or a website address identification apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102, 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as webpage browser applications, security applications, etc. may be installed on the terminal devices 101, 102 and 103.

The terminal devices 101, 102 and 103 may be various electronic devices capable of interacting with the server, including but not limited to, smart phones, tablet computers, e-book readers, MP3 (Moving Picture Experts Group Audio Layer III) players, MP4 (Moving Picture Experts Group Audio Layer IV) players, laptop computers and desktop computers. The server 105 may be a server providing various services, for example, a background server for providing supports to webpages or other application data displayed on the terminal devices 101, 102, 103. The background server may analyze the received website address and other data and feed back a processing result (for example, website address identification information) to the terminal devices.

It should be noted that, the website address identification method provided by the embodiment of the present application is generally executed by the server 105, and a part of steps may also be implemented by the terminal device; and accordingly, the website address identification apparatus is generally installed on the server 105, and a part of units may also be installed on the terminal device.

It should be appreciated that the numbers of the terminal devices, the networks and the servers in FIG. 1 are merely illustrative. Any number of terminal devices, networks and servers may be provided based on the actual requirements. Continue referring to FIG. 2, it shows a flow 200 of one embodiment of a website address identification method according to the present application. The website address identification method includes the following steps:

Step 201, obtain a website address to be identified.

In the embodiment, an electronic device (for example, the server as shown in FIG. 1) on which the website address identification method is operated can obtain the to-be-identified website address in various modes. For example, the electronic device can receive the to-be-identified website address from a terminal that is used by the user for webpage browsing or website address detection in a wired connection mode or a wireless connection mode. In practice, the website address is generally expressed by a uniform resource locator (URL). It should be noted that, the wireless connection mode can include, but not limited to, 3G/4G connection, WiFi connection, Bluetooth connection, WiMAX connection, Zigbee connection, UWB (ultra wideband) connection, and other wireless connection modes which are known at present or to be developed in the future.

Usually, the user can use a web browser installed on the terminal to browse a webpage. At this time, the user can directly input the website address or click a link on a webpage displayed in the web browser to initiate a webpage browsing request to the web server. A web server may then obtain the corresponding website address, and the website address may be used as the to-be-identified website address. In the embodiment, the webpage may include a webpage in an html format, an XHTML format, an ASPT format, a PHP format, a JSP format, an SHTML format, an NSP format, an XML format or a webpage in other formats which will be developed in the future (as long as the webpage file in this format may be opened by the browser, and pictures, animations, characters and other contents contained in the webpage file may be browsed). Those skilled in the art can appreciate that the web server may send the to-be-identified website address to the electronic device, thus allowing the electronic device to obtain the to-be-identified website address, or the web server itself may be used as the electronic device to execute the method described in the embodiment.

The user may also input the website address through a security application with a spam website address identification function in the terminal device. After receiving the to-be-identified website address, the security application may send the website address to a corresponding application server. The application server may be used as the electronic device to execute the method described in the embodiment.

It should be noted that, the to-be-identified website address may also be stored in the electronic device in advance or may be obtained by the electronic device from other servers.

Step 202, segment the to-be-identified website address into a plurality of website address parts according to a preset rule, and the segmented website address parts are then converted into type identifiers corresponding to the content types of the website address parts.

In the embodiment, based on the to-be-identified website address obtained in the step 201, the electronic device (for example, the server 105 as shown in FIG. 1) may first segment the to-be-identified website address. The segmenting method may be carried out according to the preset rule. The preset rule may include a separator segmentation rule and other segmentation rules. During actual segmentation, the electronic device may invoke a segmentation function to carry out the segmentation processing. For example, when the Python language is used, a urlparse function provided by the system be invoked to carry out the segmentation processing. After the segmentation processing, the segmented parts of the website address generally may include a host name, a path, a key and a value of a request parameter, as well as other parameters.

The electronic device then converts the segmented parts into the type identifiers corresponding to the content types of the website address parts. Optionally, the content types of the parts may include a URL type, a non-ASCII code type, a word type, a space type, a control character type, a reserved character type and other types. The meanings of the content types and the corresponding type identifiers can be listed in the following table.

| Content type | Meaning | Type identifier |
|---|---|---|
| URI type | Character string in uri format | U |
| Non-ASCII code | Character excluding \x00-\x7F | N |
| Word type | 63 characters in total, including numbers \x30-\x39, letters \x41-\x5A \x61-\x7, and underline \x5F | W |
| Space type | 7 characters in total, including null characters \x00NUL \x09\t \x0A\n \x0B\v \x0C\f \x0D\r \x20space | S |
| Control character type | 27 characters in total, including \x7F and characters excluding \x00,\x09,\x0A,\x0B,\x0C,\x0D in \x00-\x1F | V |
| Reserved character type | 31 characters in total, including ! " # $ % & ' ( ) * + , - . / : ;< = > ? @ [ \ ] ^ ` { | } ~ | |
| Other types | Types excluding the above types | O |

Wherein, the reserved character refers to a character having specific meaning, for example, / refers to a website address separator, which does not need to be converted into the corresponding type identifier; and the other types are other content types different from the above types, and if all contents have been segmented with a type excluding the other types, the other types may be null.

It should be noted that, the above segmentation of the content types and the corresponding type identifiers are merely an example. Those skilled in the art can appreciate that the parts of the website address may also be segmented according to other rules and are converted into the corresponding type identifiers.

By means of the above process, the electronic device may obtain a type identifier sequence corresponding to the to-be-identified website address through the step 202.

Step 203, a probability value of the to-be-identified website address being a non-spam website address is determined according to the type identifier sequence corresponding to the to-be-identified website address.

In the embodiment, based on the segmentation and conversion operations in the step 202, the type identifier sequence corresponding to the to-be-identified website address may be obtained. The electronic device may further calculate the probability of the to-be-identified website address being the spam website address according to the type identifier sequence in the step 203. Optionally, the electronic device may count a large number of spam website address and non-spam website address to obtain the probability value of each type identifier sequence being the non-spam website address.

Step 204, website address identification information is generated based on the probability value.

In the embodiment, after obtaining the probability value of the to-be-identified website address being the non-spam website address in step 203, the electronic device may generate the corresponding website address identification information based on the probability value. Generally, the higher is the probability value, the lower is the possibility of the website address being the spam website address; and the lower is the probability value, the higher is the possibility of the website address being the spam website address. The electronic device may set one or more probability values and determine which website address identification information is to be generated according to the relationship of the probability value and the probability threshold. The website address identification information is used for displaying information of the identification result. For example, the website address identification information may be spam website address notification information or safe website address notification information.

Figure 3:
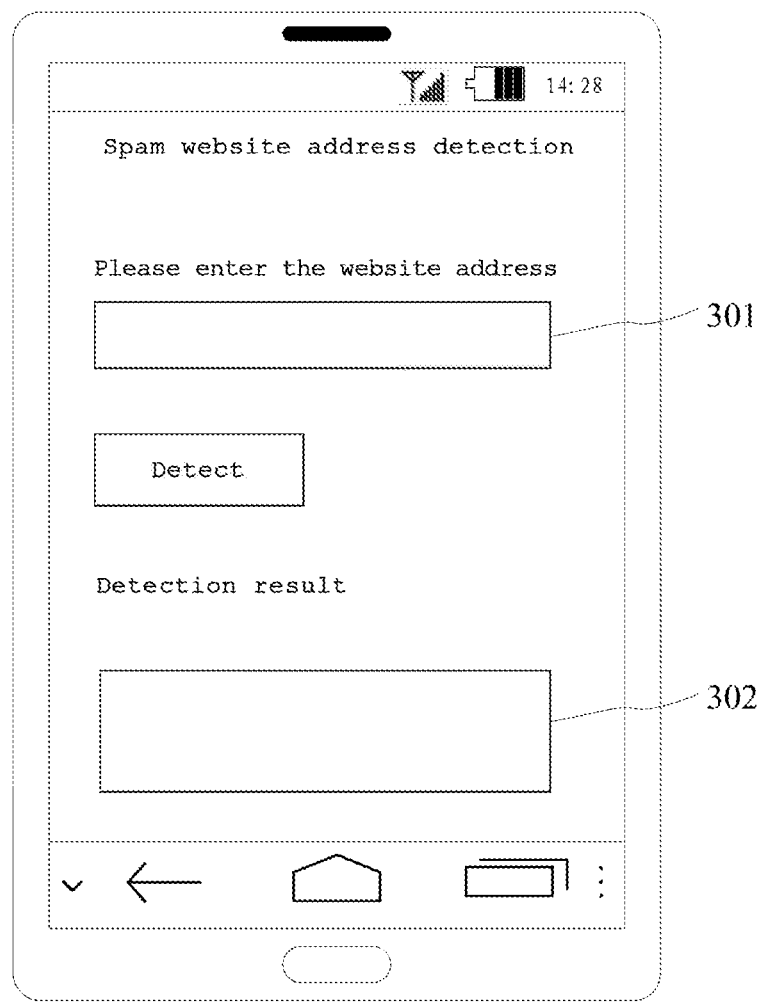
FIG. 3 is a schematic diagram of an application scenario of a website address identification method according to the present application.

Continue referring to FIG. 3, FIG. 3 is a schematic diagram of an application scenario of a website address identification method according to the present application. As shown in FIG. 3, the user may input the to-be-identified website address in a website address input area 301 on a website address identification application interface on the terminal device, and click a detection button on the interface to send the to-be-identified website address to the background server, and the background server may obtain the to-be-identified website address at background. The background server may then convert the to-be-identified website address into the corresponding type identifier sequence and calculate the possibility of the website address being the spam website address according to the type identifier sequence. The background server may generate the website address identification information based on the probability. Finally, the background server may return the website address identification information to the terminal device, and the terminal device may display the corresponding website address identification information in a display area 302.

According to the method provided by the above embodiment of the present application, the website address is converted into the corresponding type identifier sequence and then is identified, so that the processed data amount in the identification process is obviously reduced, and the website address identification efficiency is improved. Meanwhile, in this mode, the website address may be identified only according to the type identifier sequence, and the website address exactly corresponding to the to-be-identified website address does not need to be stored in advance, so that the website address identification range is expanded.

Figure 4:
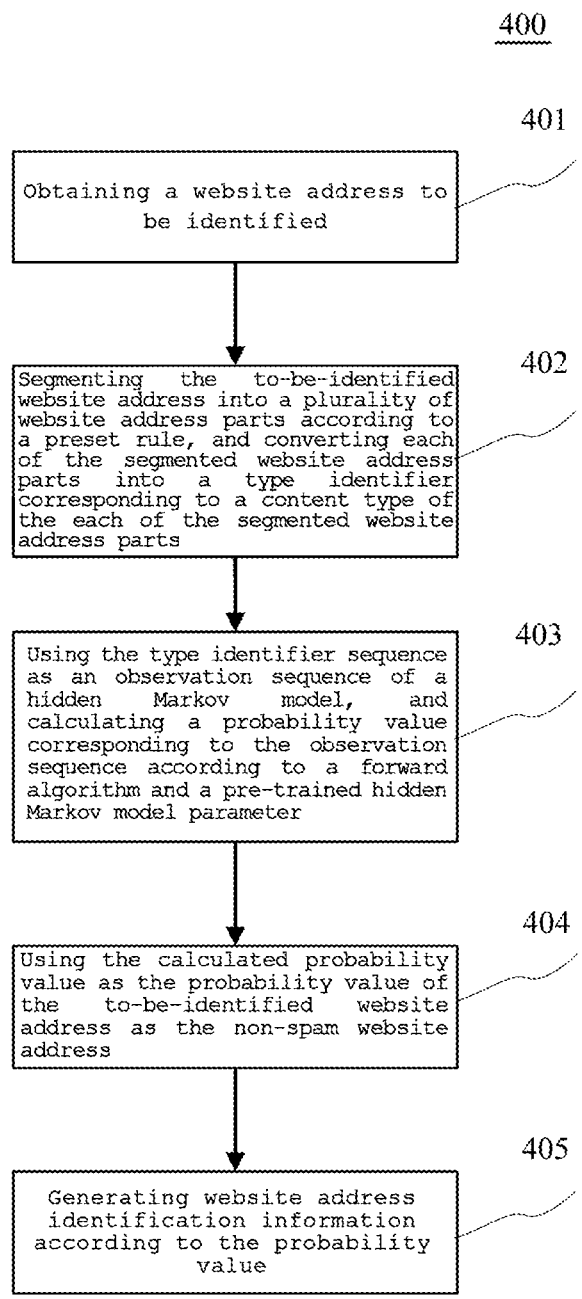
FIG. 4 is a flowchart of another embodiment of a website address identification method according to the present application.

Further referring to FIG. 4, it shows a flow 400 of another embodiment of the website address identification method. The flow 400 of the website address identification method includes the following steps:

Step 401, obtain a website address to be identified.

Figure 2:
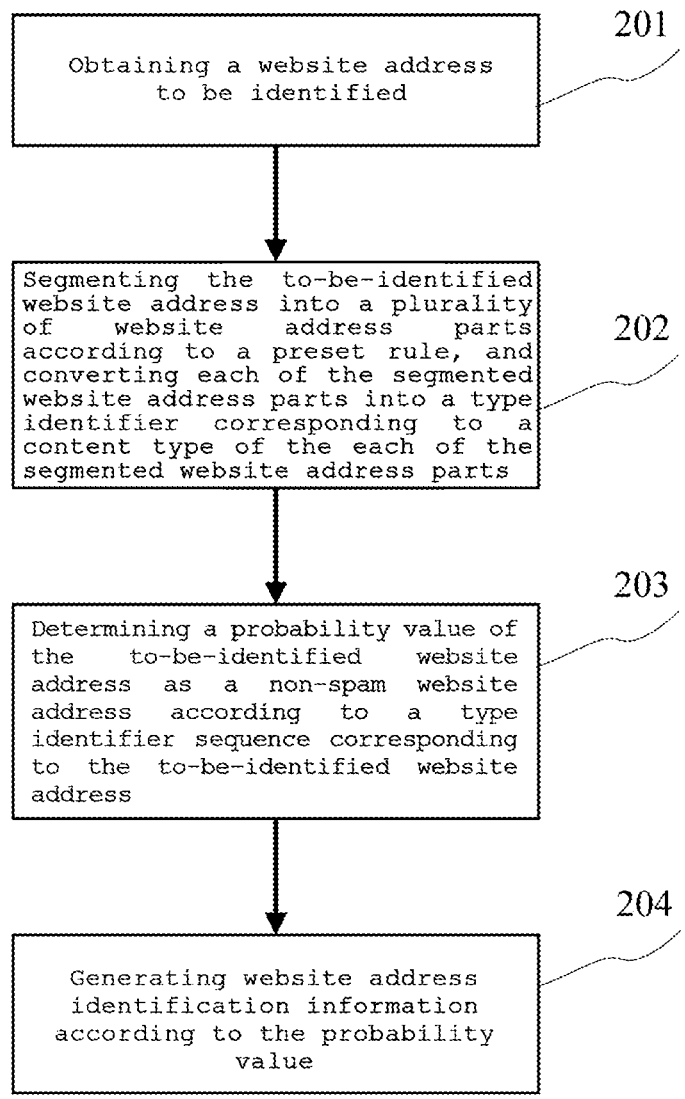
FIG. 2 is a flowchart of one embodiment of a website address identification method according to the present application.

In the embodiment, the step 401 is generally the same as the step 201 in the embodiment corresponding to FIG. 2, and will not be repeatedly described herein.

Step 402, segment the to-be-identified website address into a plurality of website address parts according to a preset rule, and convert each of the segmented website address parts a type identifier corresponding to a content type of the website address parts.

In the embodiment, the step 402 is generally the same as the step 202 in the embodiment corresponding to FIG. 2, and will not be repeatedly described herein.

Step 403, a type identifier sequence is used as an observation sequence of a hidden Markov model, and a probability value corresponding to the observation sequence is calculated according to a forward algorithm and a pre-trained hidden Markov model parameter.

In the embodiment, based on the segmentation and conversion operations in the step 402, the type identifier sequence corresponding to the to-be-identified website address may be obtained, and the type identifier sequence is further processed by the hidden Markov model in the step 403. At first, the type identifier sequence is used as the observation sequence of the hidden Markov model, and the model hidden Markov model parameter may be obtained by pre-training. The model parameter may include an initial state probability matrix, an implicit state transition probability matrix and an observation state transition probability matrix of the hidden Markov model. Thereafter, after determining the model parameter and the observation sequence of the hidden Markov model, the electronic device may calculate the probability value corresponding to the observation sequence according to the forward algorithm suitable for the hidden Markov model and the model parameter. In the case that the model parameter and the observation sequence of the hidden Markov model are given, the calculation of the probability value corresponding to the observation sequence by the forward algorithm belongs to the prior art in the field, and will not be described herein.

In some optional implementation of the embodiment, the electronic device may obtain the pre-trained hidden Markov model parameter by a model training step, which includes:

Firstly, obtain a non-spam website address set from a log server, wherein, a large number of website addresses may be stored in the log server, and the website addresses may be obtained by the log server from other distributed servers in advance. Marks may be set in the log server to distinguish spam website addresses from non-spam website addresses. The electronic device may obtain the non-spam website address set according to the marks corresponding to the non-spam website addresses.

Then, the electronic device may segment each website address in the non-spam website address set into a plurality of website address parts according to the preset rule, and convert each of the segmented website address parts of each website address into a type identifier corresponding to the content type of the each of the website address parts to generate a type identifier sequence set containing the type identifier sequence of each website address. The segmentation of a single website address in the non-spam website address set and the conversion of the website address parts may be the same as the step 202 in the embodiment corresponding to FIG. 2, and will not be repeatedly described herein.

Then, the electronic device may use the type identifier sequence set as observation sequences to be trained in the hidden Markov model, and determine the parameter of the hidden Markov model corresponding to these observation sequences to be trained according to a maximum expectation algorithm. The calculation of the parameter of the hidden Markov model by the maximum expectation algorithm belongs to the prior art in the field, and will not be described herein.

Finally, the determined hidden Markov model parameter is used as the pre-trained hidden Markov model parameter, or the pre-trained hidden Markov model parameter is updated according to the determined hidden Markov model parameter. When updating the pre-trained hidden Markov model parameter, a larger weight may be set for the currently determined hidden Markov model parameter to improve the instantaneity of the updated hidden Markov model parameter.

Optionally, the maximum expectation algorithm may be a forward-backward algorithm to improve the calculation speed of the model parameter, so as to shorten the time for training the hidden Markov model parameter.

Step 404, the calculated probability value is used as the probability value of the to-be-identified website address being the non-spam website address.

In the embodiment, based on the probability value calculated in the step 403, the electronic device may use the probability value as the probability value of the to-be-identified website address being the non-spam website address. Generally, the model parameter may be obtained by counting or training normal website addresses, so that the obtained probability value may be used as the probability of the to-be-identified website address being the non-spam website address.

Step 405, website address identification information is generated according to the probability value.

In the embodiment, after obtaining the probability value of the to-be-identified website address being the non-spam website address, the electronic device may generate the corresponding website address identification information according to the probability value.

In some optional implementation of the embodiment, the step 405 may include: generating non-spam website address notification information in response to the probability value being larger than a preset probability threshold.

It may be seen from FIG. 4 that, compared with the embodiment corresponding to FIG. 2, the flow 400 of the website address identification method in this embodiment highlights that, according to the hidden Markov model, the type identifier sequence is used as the observation sequence to calculate the probability of the to-be-identified website address being the non-spam website address. Therefore, the solution described in this embodiment may further improve the identification accuracy and speed.

In some optional implementation of the embodiment, the step 405 may include generating the non-spam website address notification information in response to the probability value being larger than the preset probability threshold. Optionally, after generating the non-spam website address notification information, the implementation may further include the following steps:

receiving confirmation information of the user about whether the to-be-identified website address is a spam website address or a non-spam website address; and using the type identifier sequence corresponding to the to-be-identified website address that is confirmed as the non-spam website address as the observation sequence to be trained of the hidden Markov model, and updating the pre-trained hidden Markov model parameter with the maximum expectation algorithm.

The electronic device may receive the confirmation information of the user about whether the to-be-identified website address is the spam website address or the non-spam website address through a control or other interactive modes. For example, the electronic device may provide two button controls displaying "spam website address" and "non-spam website address" for the user to click. When the user clicks "non-spam website address", the corresponding confirmation information is non-spam website address confirmation information; and when the user clicks "spam website address", the corresponding confirmation information is spam website address confirmation information. When the to-be-identified website address is confirmed as the non-spam website address by the confirmation information, it indicates that a normal website address is deemed as a spam website address by mistake, so the type identifier sequence corresponding to the to-be-identified website address which is deemed as the spam website address by mistake may be used as training data for updating the pre-trained hidden Markov model parameter. The corresponding method is to use the type identifier sequence as the observation sequence to be trained of the hidden Markov model, and update the pre-trained hidden Markov model parameter with the maximum expectation algorithm. The updating of the model parameter according to the maximum expectation algorithm and the observation sequence to be trained belongs to the prior art, and will not be described herein. Optionally, the maximum expectation algorithm herein may also be the forward-backward algorithm. In this implementation, the website address which is deemed as the spam website address by mistake is used for updating the hidden Markov model parameter to improve the accuracy and the instantaneity of the hidden Markov model parameter, and thus the accuracy of identifying the spam website address by the hidden Markov model is improved.

Figure 5:
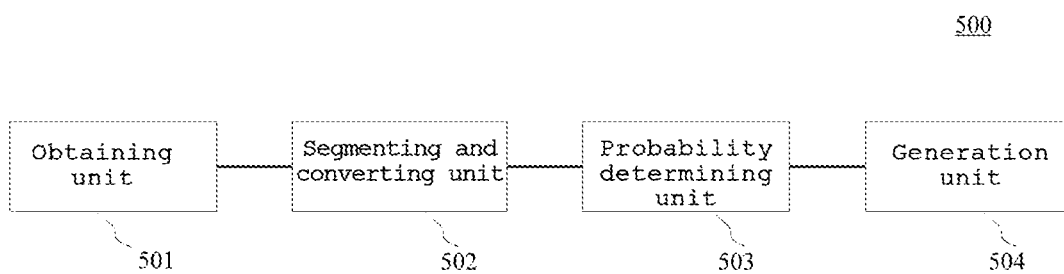
FIG. 5 is a structure schematic diagram of one embodiment of a website address identification apparatus according to the present application.

Further referring to FIG. 5, as an implementation of the method shown in the above figures, the present application provides an embodiment of a website address identification apparatus. The embodiment of the apparatus corresponds to the embodiment of the method as shown in FIG. 2, and the apparatus may be specifically applied in various electronic devices.

As shown in FIG. 5, the website address identification apparatus 500 in the embodiment includes: an obtaining unit 501, a segmenting and converting unit 502, a probability determining unit 503 and a generation unit 504. The obtaining unit 501 is used for obtaining a website address to be identified; the segmenting and converting unit 502 is used for segmenting the to-be-identified website address into a plurality of website address parts according to a preset rule, and converting each of the segmented website address parts into a type identifier corresponding to a content type of the each of the segmented website address parts; the probability determining unit 503 is used for determining a probability value of the to-be-identified website address being a non-spam website address according to a type identifier sequence corresponding to the to-be-identified website address; and the generation unit 504 is used for generating website address identification information according to the probability value.

In the embodiment, the obtaining unit 501 of the website address identification apparatus 500 may receive the to-be-identified website address from a terminal that is used by the user for webpage browsing or website address detection in a wired connection mode or a wireless connection mode. In practice, the website address is generally represented by a uniform resource locator (Uniform Resource Locator, URL). It should be noted that, the wireless connection mode may include, but not limited to, 3G/4G connection, WiFi connection, Bluetooth connection, WiMAX connection, Zigbee connection, UWB (ultra wideband) connection, as well as other wireless connection modes which are known at present or are developed in the future.

In the embodiment, based on the website address obtained by the obtaining unit 501, the segmenting and converting unit 502 may fristly segment the to-be-identified website address into a plurality of website address parts. The segmenting method may be carried out according to the preset rule. Generally, the electronic device may segment the website address by a separator, and the segmented parts of the website address generally include a mainframe name, a path, a key and a value of a request parameter. And then, the segmenting and converting unit 502 converts each of the segmented parts into the type identifier corresponding to the content type of the each of the segmented website address parts. Optionally, the content type of each part may include a URL type, a non-ASCII code type, a word type, a space type, a control character type, a reserved character type and other types.

In the embodiment, based on the type identifier sequence corresponding to the to-be-identified website address, the probability determining unit 503 may calculate the probability of the to-be-identified website address being the spam website address according to the type identifier sequence. Optionally, the electronic device may count a large number of spam website addresses and non-spam website addresses to obtain the probability value of each type identifier sequence being the non-spam website address.

In the embodiment, the generation unit 504 may generate the corresponding website address identification information based on the probability value obtained by the probability determining unit 503.

Those skilled in the art should understand that, the website address identification apparatus 500 further includes some other known structures, such as a processor, a memory and the like, and in order not to unnecessarily fuzz up the disclosed embodiments, these known structures are not shown in FIG. 5.

Figure 6:
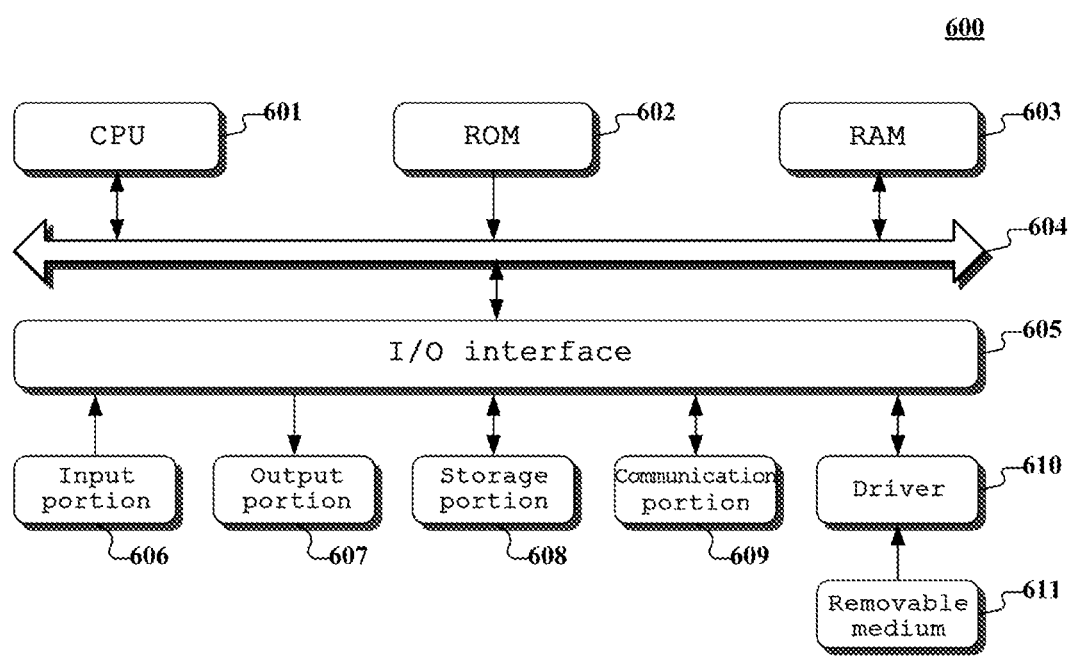
FIG. 6 illustrates a structural schematic diagram of a computer system adapted to implement a terminal device or a server of the embodiments of the present application.

Referring to FIG. 6, a schematic structural diagram of a computer system 600 adapted to implement a terminal apparatus or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising an obtaining unit, a segmenting and converting unit, a probability determining unit and a generation unit, where the names of these units are not considered as a limitation to the units. For example, the obtaining unit may also be described as "a unit for obtaining a website address to be identified".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are performed by one or more devices, the devices obtain a website address to be identified; segment the to-be-identified website address into a plurality of website address parts according to a preset rule, and convert each of the segmented website address parts into a type identifier corresponding to a content type of the each of the segmented website address parts; determine a probability value of the to-be-identified website address as a non-spam website address according to a type identifier sequence corresponding to the to-be-identified website address; and generate website address identification information according to the probability value.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A website address identification method, comprising:
    defining a plurality of non-identical type identifiers, each of the type identifiers corresponding to a plurality of characters included in a respective content type, wherein different type identifiers correspond to different characters, and a given sequence of the type identifiers including an alphabetic character corresponds to a plurality of different website addresses;
    obtaining a website address to be identified from the plurality of different website addresses;
    segmenting the to-be-identified website address into a plurality of website address parts according to a preset rule, and converting the segmented website address parts into the given sequence of the type identifiers including the alphabetic character and corresponding to the content types of the each of the segmented website address parts;
    determining a probability value of the to-be-identified website address as a non-spam website address according to the given sequence of the type identifiers wherein the determining a probability value of the to-be-identified website address as a non-spam website address according to the given sequence of the type identifiers:
        inputting the given sequence of the type identifiers including the alphabetic character into a classifier to acquire the probability value of the to-be-identified website address, wherein the classifier is configured to receive the given sequence of the type identifiers as an input and output a given non-spam probability value for the given sequence of the type identifiers as the probability value for the plurality of website addresses; and
    generating website address identification information according to the probability value.

2. The method of claim 1, wherein the classifier is a hidden Markov mode, and the determining a probability value of the to-be-identified address as a non-spam website address according to the given sequence of the type identifiers
    using the type identifier sequence as an observation sequence of the hidden Markov model, and calculating a probability value corresponding to the observation sequence according to a forward algorithm and a pre-trained hidden Markov model parameter; and
    using the calculated probability value as the probability value of the to-be-identified website address as the non-spam website address.

3. The method of claim 2, wherein before obtaining a website address to be identified, the method further comprises:
    obtaining a non-spam website address set from a log server;
    segmenting each website address in the non-spam website address set into a plurality of website address parts according to the preset rule, and converting each of the segmented website address parts of each website address into the type identifier corresponding to the content type of the each of the segmented website address parts to generate a type identifier sequence set containing the type identifier sequence of each website address;
    using the type identifier sequence set as an observation sequence set to be trained of the hidden Markov model, and determining the hidden Markov model parameter according to a maximum expectation algorithm; and
    using the determined hidden Markov model parameter as the pre-trained hidden Markov model parameter, or updating the pre-trained hidden Markov model parameter according to the determined hidden Markov model parameter.

4. The method of claim 3, wherein the maximum expectation algorithm is a forward-backward algorithm.

5. The method of claim 2, wherein generating website address identification information according to the probability value comprises:
    generating non-spam website address notification information in response to the probability value being larger than a preset probability threshold.

6. The method of claim 2, wherein generating website address identification information according to the probability value comprises:
    generating spam website address notification information in response to the probability value being smaller than the preset probability threshold.

7. The method of claim 6, wherein after generating spam website address notification information in response to the probability value being smaller than the preset probability threshold, the method further comprises:
    receiving confirmation information of the user about whether the to-be-identified website address is a spam website address or a non-spam website address; and
    using the type identifier sequence corresponding to the to-be-identified website address that is confirmed as the non-spam website address as the observation sequence to be trained of the hidden Markov model, and updating the pre-trained hidden Markov model parameter with the maximum expectation algorithm.

8. The method of claim 1, wherein the defined type identifiers comprise a type identifier corresponding to a character string in a predefined format.

9. The method of claim 8, wherein the type identifier corresponding to the character string in the predefined format is consisted of one character.

10. The method of claim 1, wherein the segmenting the to-be-identified website address into a plurality of website address parts according to a preset rule comprises: segmenting the to-be-identified website address into a host name, a path, a key and a value of a request parameter.

11. The method of claim 1, wherein the content type comprises a non-ASCII type, wherein the characters excluding ASCII codes corresponds to the non-ASCII type.

12. The method of claim 11, wherein the content type comprises a URI (uniform resource identifier) type, a word type, and a space type, wherein the URI type corresponds to a sequence of characters arranged in a URI format, the word type corresponds to letters, numbers and underline, and the space type corresponds to null characters.

13. A website address identification apparatus, comprising:
at least one processor; and
a memory storing instructions, wherein the instructions when executed by the at least one processor, cause the at least one processor to perform operations, the operations comprising:
defining a plurality of non-identical type identifiers, each of the type identifiers corresponding to a plurality of characters included in a respective content type, wherein different type identifiers correspond to different characters, and a given sequence of the type identifiers including an alphabetic character corresponds to a plurality of different website addresses;
obtaining a website address to be identified from the plurality of different website addresses;
segmenting the to-be-identified website address into a plurality of website address parts according to a preset rule, and converting the segmented website address parts into the given sequence of the type identifiers including the alphabetic character and corresponding to the content type of the each of the segmented website address parts;
determining a probability value of the to-be-identified website address as a non-spam website address according to the given sequence of the type identifiers wherein the determining a probability value of the to-be-identified website address as a non-spam website address according to the given sequence of the type identifiers comprises: inputting the given sequence of the type identifiers including the alphabetic character into a classifier to acquire the probability value of the to-be-identified website address, wherein the classifier is configured to receive the given sequence of the type identifiers as an input and output a given non-spam probability value for the given sequence of the type identifiers as the probability value for the plurality of website addresses; and
generating website address identification information according to the probability value.

14. The apparatus of claim 13, wherein the classifier is a hidden Markov mode, and the determining a probability value of the to-be-identified website address as a non-spam website address according to the given sequence of the type identifiers comprises:
using the type identifier sequence as an observation sequence of the hidden Markov model, and calculating a probability value corresponding to the observation sequence according to a forward algorithm and a pre-trained hidden Markov model parameter; and
using the calculated probability value as the probability value of the to-be-identified website address as the non-spam website address.

15. The apparatus of claim 14, wherein before obtaining a website address to be identified, the operations further comprise:
obtaining a non-spam website address set from a log server;
segmenting each website address in the non-spam website address set into a plurality of website address parts according to the preset rule, and converting each of the segmented website address parts of each website address into the type identifier corresponding to the content type of the each of the segmented website address parts to generate a type identifier sequence set containing the type identifier sequence of each website address;
using the type identifier sequence set as an observation sequence set to be trained of the hidden Markov model, and determining the hidden Markov model parameter according to a maximum expectation algorithm; and
using the determined hidden Markov model parameter as the pre-trained hidden Markov model parameter, or updating the pre-trained hidden Markov model parameter according to the determined hidden Markov model parameter.

16. The apparatus of claim 15, wherein the maximum expectation algorithm is a forward-backward algorithm.

17. The apparatus of claim 14, wherein generating website address identification information according to the probability value comprises: generating non-spam website address notification information in response to the probability value being larger than a preset probability threshold.

18. The apparatus of claim 14, wherein generating website address identification information according to the probability value comprises generating spam website address notification information in response to the probability value being smaller than the preset probability threshold.

19. The apparatus of claim 18, wherein after generating spam website address notification information in response to the probability value being smaller than the preset probability threshold, the method further comprises:
receiving confirmation information of the user about whether the to-be-identified website address is a spam website address or a non-spam website address; and
using the type identifier sequence corresponding to the to-be-identified website address that is confirmed as the non-spam website address as the observation sequence to be trained of the hidden Markov model, and updating the pre-trained hidden Markov model parameter with the maximum expectation algorithm.

20. A computer readable storage medium, in which one or more computer executable instructions are stored, wherein when the one or more programs are performed by a processor, the processor is operable to define a plurality of non-identical type identifiers, each of the type identifiers corresponding to a plurality of characters included in a respective content type, wherein different type identifiers correspond to different characters, and a given sequence of the type identifiers including an alphabetic character corresponds to a plurality of different website addresses; obtain a website address to be identified from the plurality of different websites; segment the to-be-identified address into a plurality of website address parts according to a preset rule, and convert the segmented website address parts into the given sequence of the type identifiers including the alphabetic character and corresponding to the content types of the segmented website address parts; determine a probability value of the to-be-identified website address as a non-spam website address according to the given sequence of the type identifiers, wherein the determining a probability value of the to-be-identified website address as a non-spam website address according to the given sequence of the type identifiers comprises: inputting the given sequence of the type identifiers including the alphabetic character into a classifier to acquire the probability value of the to-be-identified website address, wherein the classifier is configured to receive the given sequence of the type identifiers as an input and output a given non-spam probability value for the given sequence of the type identifiers as the probability value for the plurality of website addresses; and generate website address identification information according to the probability value.

\* \* \* \* \*